Figure 7:
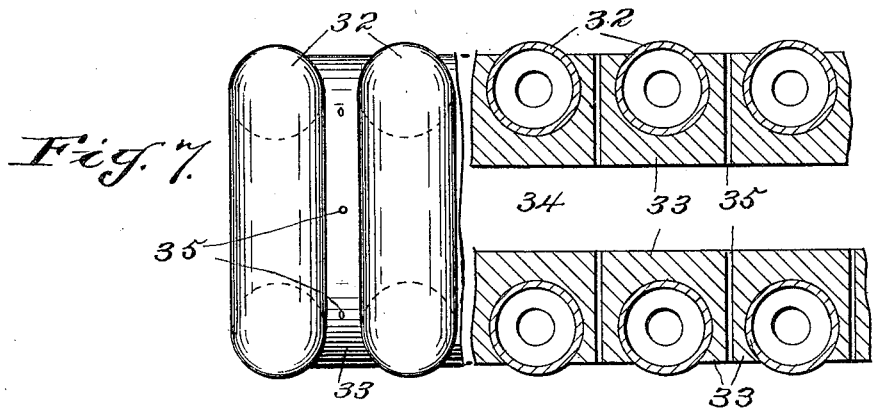

D. B. DEVORE.
MULTIPLE COMBUSTION FURNACE.
APPLICATION FILED MAR. 25, 1915.
1,149,739.
Patented Aug. 10, 1915.
5 SHEETS—SHEET 1.
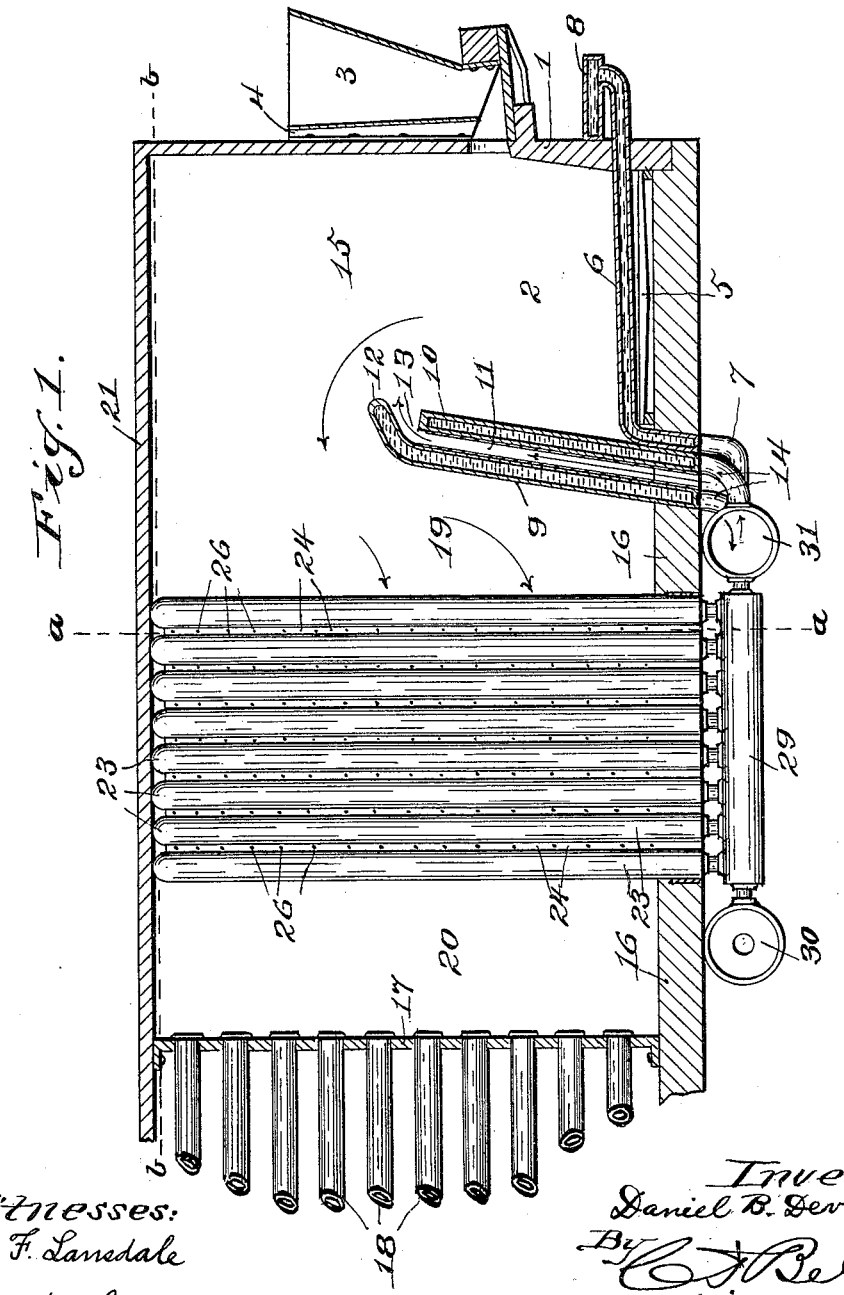

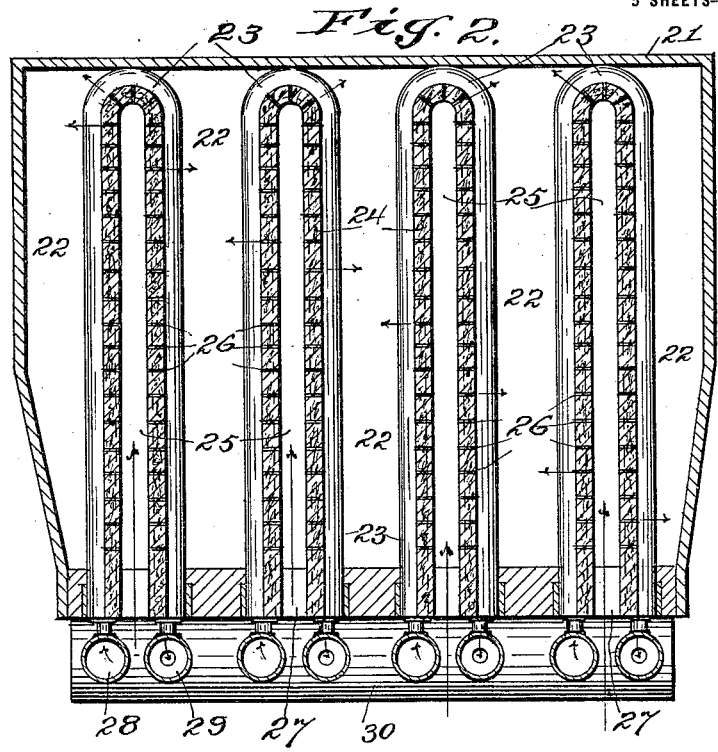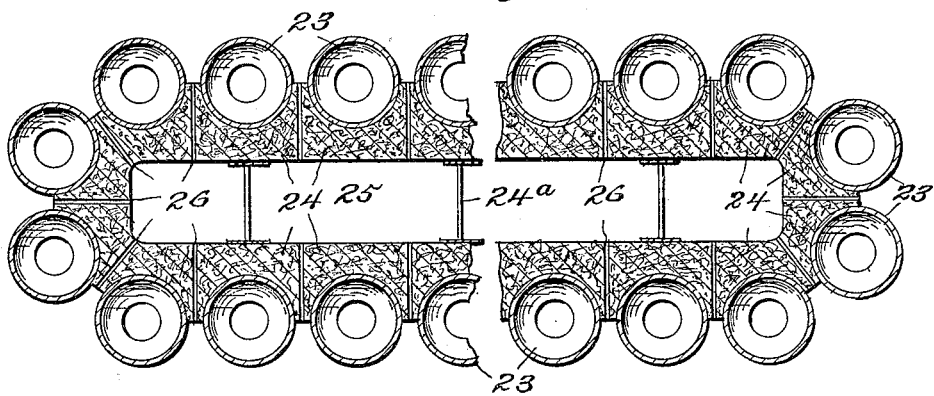

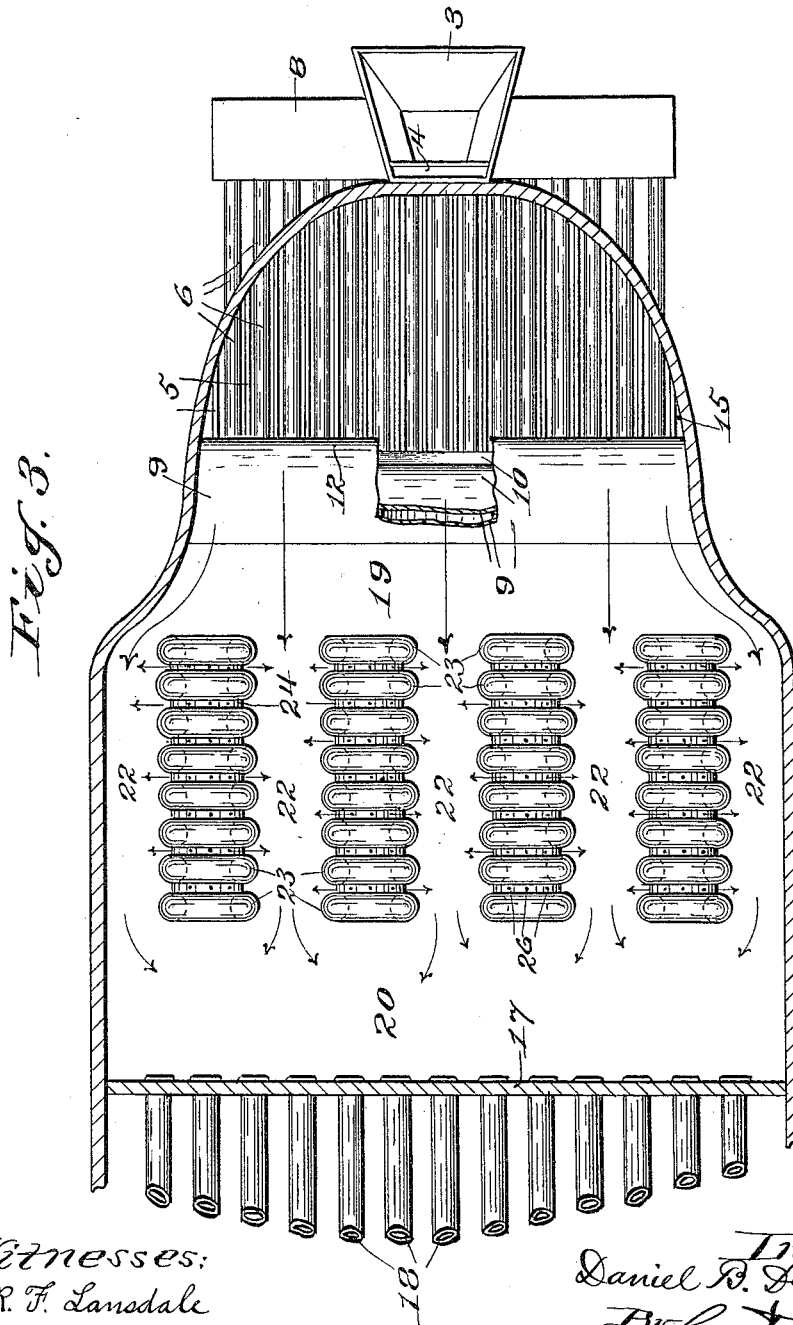

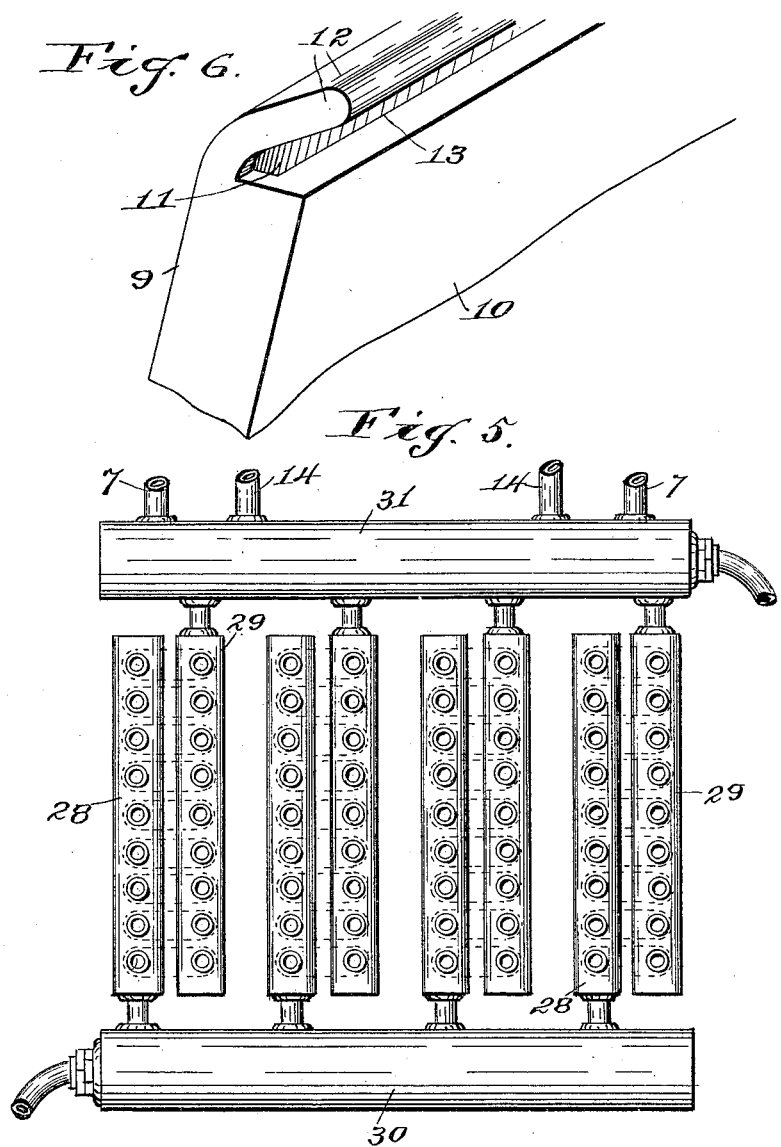

D. B. DEVORE.
MULTIPLE COMBUSTION FURNACE.
APPLICATION FILED MAR. 25, 1915.

1,149,739.

Patented Aug. 10, 1915.
5 SHEETS—SHEET 5.

Witnesses:
R. F. Lanedale
W. H. Wills

Inventor
Daniel B. Devore
By C. F. Pelt
Attorney.

UNITED STATES PATENT OFFICE.

DANIEL B. DEVORE, OF WASHINGTON, DISTRICT OF COLUMBIA, ASSIGNOR OF ONE-THIRD TO WILLIAM THORNWALL DAVIS AND ONE-THIRD TO THOMAS PERRY LIPPITT, BOTH OF WASHINGTON, DISTRICT OF COLUMBIA.

MULTIPLE-COMBUSTION FURNACE.

1,149,739. Specification of Letters Patent. Patented Aug. 10, 1915.

Application filed March 25, 1915. Serial No. 16,960.

*To all whom it may concern:*

Be it known that I, DANIEL B. DEVORE, a citizen of the United States, residing at Washington, in the District of Columbia, have invented certain new and useful Improvements in Multiple-Combustion Furnaces, of which the following is a specification.

This invention relates to furnaces, and pertains especially to appliances for heating and mixing air with the products of combustion in multiple combustion chambers located between the fuel chamber and the flues or other heat absorbing element of a furnace.

The object of the invention is to increase economy in fuel and in the heating capacity of steam boiler and other furnaces by providing appliances for highly heating air and for thoroughly mixing the highly heated air with the furnace gases and products of combustion for further burning, combustion and expansion, in auxiliary mixing and combustion chambers separated by air chambers for emitting multiple jets of air into the auxiliary chambers so as to attain a more perfect combustion of the gases and products of combustion before they enter the flues of a boiler.

A further object of the invention is to provide, water-jacketed air chambers in the path of movement of the products of combustion to the boiler tubes or other heat absorbing element so as to form auxiliary combustion chambers in which highly heated air is ejected from the said air chambers in such quantity as to thoroughly mix with the gases, thereby perfecting combustion, evolving and generating more heat from the fuel, and resulting in the saving of fuel and arresting the smoke and combustibles.

To these ends the invention consists essentially in applying a plurality of water jackets arranged in separate plural nests or sets between the fire chamber and the flues or other heat consuming element of a furnace so as to form auxiliary combustion chambers between the fire chamber and the flues, the jackets being so arranged in connection with a filling of non-heat conducting material as to form an air chamber in each nest, which shall emit jets of air into the auxiliary chambers.

The invention further consists in the construction, arrangement and combination of the various parts of the apparatus for attaining more perfect combustion and a higher degree of heat from the usual amount of ordinary fuel.

Figure 8:
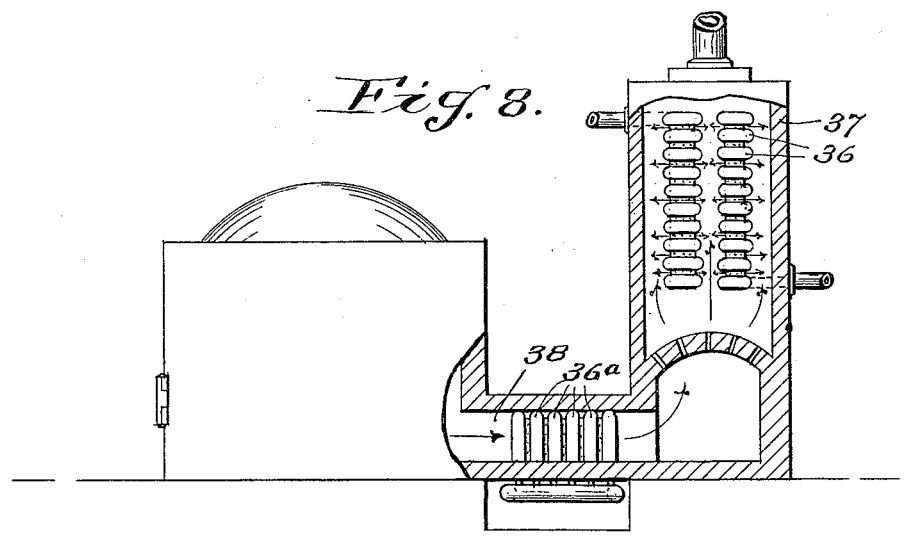

In the accompanying drawings forming part of this application: Figure 1 is a longitudinal sectional view of the fire box and part of a tubular boiler exemplifying the invention, and showing a nest of pipes in side elevation. Fig. 2 is a sectional view taken on the dotted line *a—a* Fig. 1, showing the pipe nests in end elevation. Fig. 3 is a top plan view, with the crown sheet removed, and showing the relative position of the pipe nests with respect to the boiler tubes and the fire box. Fig. 4 is a detail cross section of one nest of pipes taken through the air jet apertures and showing the air chamber as formed by the pipes and the intervening filling. Fig. 5 is a detail plan view of the pipe nests showing means for connecting the water pipes with the boiler. Fig. 6 is a detail sectional view taken on the dotted line *b—b* Fig. 1, showing the water grate bars in plan view. Fig. 7 is a sectional elevation of a nest of pipes showing a modification. Fig. 8 is a sectional elevation showing the pipe nests applied to an upright boiler.

The same reference characters denote the same parts throughout the several views of the drawings.

My invention is applicable to various types of tubular boilers, but for the purpose of exemplification a horizontal tubular boiler is first shown embodying my complete invention, and then the nests of pipes are shown in a vertical tubular boiler.

The front 1 of the fire box 2 has a coal hopper 3, and a draft space 4 between the hopper and the front 1. I employ a double grate, the lower one 5, of which, is surmounted by water grate bars 6, to which water may be applied by means of a supply pipe 7 under the floor of the fire box. The outer end of the water bars 6 is connected by a water box 8 or other suitable means across the front of the fire box, and said box may be connected with the water compartment of the boiler. A fire box back is secured adjacent to the rear end of the water grate, and comprises a pair of water-containing plates 9 and 10, with an air draft flue 11, between said plates, and said flue extends through the floor of the fire box. The plate 9 terminates at the top in a hood 12 which extends over the top of the plate 10, and thereby forms an air draft discharge mouth 13 above the fuel 14, into the combustion chamber 15. The plates 9 and 10 have water circulating from the pipes 14. The inclined position of the plates 9 and 10 toward the front of the fire box forms a contracted flue and tends to confine the fuel heat for better combustion in the chamber 15.

Upon the floor 16 of the furnace between the fire box back and the tube head or sheet 17 which holds the boiler tubes 18, I fix, in parallel rows, nests of water pipes so as to leave a combustion chamber 19 between said back and one end of the nests and a combustion and expansion chamber 20 between the other end of the nests and tubes sheet 17. The nests extend from the boiler floor to the crown sheet 21, lengthwise the boiler, and are placed at equal distance apart so as to divide the boiler space between the combustion chambers 19 and 20 into a plurality of horizontal combustion and mixing chambers 22, in communication with the chambers 19 and 20. All the pipe nests being of the same construction, only one of them will be described in detail. The nest comprises a plurality of vertically disposed U-shaped water pipes 23, placed adjacent to each other in parallel rows so as to leave a space between the rows for a lining or filling 24, preferably of asbestos, but other non-heat conducting material or means may be employed, as will be hereinafter explained. The filling is supported by braces 24ª, and is so placed between the rows and between the pipes constituting the rows as to fill the interval between the pipes and to form an air chamber 25, having air ducts 26 leading therefrom through the filling between the adjacent pipes, as more clearly shown in Fig. 4 of the drawings. The ends of the pipes 23 are secured to and extend through the boiler floor which has openings or slots 27 for supplying air to the chambers 25, and the pipes 23 are connected with water pipes 28 and 29, located under the boiler floor, and which are connected with the boiler by pipes 30 and 31. The filling between the rows of pipes of each nest extends through the length of the pipes, but the portion of the filling between the adjacent pipes of each nest stops at and rests upon the boiler floor surface, so as to make a close joint therebetween for the air chambers, and the filling at the top or bend of the pipes makes a close joint with the crown sheet of the boiler. According to this construction and arrangement the course of the products of combustion is intercepted by the pipe nests, and air is discharged from the air chambers into the auxiliary chambers and into combustion chambers 19 and 20, for complete combustion. This construction and arrangement also serves to retard the passage of the gases from the fire box sufficiently to permit the thorough and complete oxidation of all the fuel before the gases of combustion reach the boiler tubes. The asbestos being so thoroughly heated as to emit jets of highly heated air.

Referring to Fig. 5 of the drawings, it will be seen that the rows of water pipes are connected alternatively with the water supply and discharge connections so as to afford complete circulation of the water throughout the several pipe nests.

Referring to the modification shown in Fig. 7 of the drawings, the pipes 32 are joined together throughout their length by refractory walls 33 forming an air chamber 34, and said walls are provided with air ducts 35.

Referring to Fig. 8 of the drawings, the water pipe nests 36 are shown applied to a vertical furnace 37, and like nests 36ª are also located in the throat 38. The nests 36 and 36ª have the same relative arrangement as in the horizontal furnace, and thereby increase the combustion.

In order to prevent chilling of the pipes 23 and consequently cooling the water contained therein, by reason of the induction of cold air into the air chambers, it is necessary that the material between the pipes be a non-heat conductor, such as asbestos or other suitable non-heat conducting material, and such material forms the walls of the air chambers and partially covers said pipes, so that the uncovered portion of the pipes and the portions of the asbestos between the adjacent pipes constitute the side walls of the auxiliary chambers. This construction furnishes a most efficient means for forming a water chamber between two rows of parallel pipes having half of their circumference covered by non-heat conducting material and the other half exposed to the products of combustion in the auxiliary chambers.

It will be understood that the air chambers are jacketed by the water pipes, that the boiler tubes constitute the heat absorbing element, and that my invention is applicable to any form of furnace, and in the absence of the boiler tubes in a furnace, the heat absorbing element may be of some other nature.

It will be seen that I have devised means for multiplying combustion chambers, whereby increased combustion is attained; that I have furnished means wherein a body of air is heated within a body of water; and that, by reason of my construction and arrangement, the gases are intermingled and mixed with the oxygen, so that it is impossible for any gases or products of combustion to pass to the boiler tubes or heat absorbing element without being mixed with oxygen from the air chambers for further burning and combustion, whereby a maximum efficiency in the production of heat is obtained. It will be observed that the air chambers are so arranged relative to each other and to the boiler tube sheet and to the fire box back as to form a combustion chamber at each end of the air chambers and a combustion chamber on each side of the air chambers. This arrangement may be varied according to the demands in boilers or furnaces of various size and shape, without departing from the spirit of the invention.

Obviously my invention is subject to many modifications which may suggest themselves to those skilled in the art pertaining hereto, therefore I do not wish to limit or confine my invention to the specific construction and relative arrangement of parts herein shown and described, but reserve the right to make such changes and variations therein as may come within the scope of the appended claims.

Having thus described my invention what I claim as new and desire to secure by Letters Patent is:—

1. In a furnace appliance, a plurality of independent water-jacketed air chambers between the fire box and the heat absorbing element of the furnace, an auxiliary combustion chamber between each pair of said air chambers, and air ducts leading from the air chambers into the auxiliary chambers.

2. In a furnace appliance, a plurality of water-jacketed air chambers extending in parallel rows from the fire box to the heat absorbing element of the furnace, a plurality of open end auxiliary combustion chambers separating the air chambers throughout the length of the rows, and air ducts leading from the sides and ends of the air chambers between the members of the water jackets into the auxiliary chambers.

3. In a furnace appliance, a plurality of water-jacketed air chambers between the fire box and the heat absorbing element of the furnace, a plurality of auxiliary combustion chambers alternating with the air chambers, the inner sides of the jackets constituting the walls of the air chambers and the outer sides of the jackets constituting the side walls of the auxiliary chambers, and air ducts leading from the air chambers through the air chamber walls into the auxiliary chambers.

4. In a furnace appliance, a plurality of air chambers between the fire box and the heat absorbing element, the inner walls of said chambers being composed of non-heat conducting material and the outer walls of said chambers being composed of water circulating pipes, auxiliary combustion chambers alternating between the air chambers, said pipes and said material constituting the side walls of the auxiliary chambers, and air ducts extending from the air chambers through the said material into the auxiliary chambers.

5. In a furnace appliance, a plurality of air chambers between the fire box and the heat absorbing element, the walls of said chambers being composed of water circulating pipes and non-heat conducting material between the pipes, auxiliary combustion chambers having open ends for the induction and eduction of products of combustion, said auxiliary chambers alternating between the air chambers and having said pipes and portions of said material constitute the side walls of the auxiliary chambers, and air ducts extending from the air chambers through said portions of the material into the auxiliary chambers.

6. In a furnace appliance, a plurality of air chambers composed of non-heat conducting material, water pipes extending over the sides and top of the material with a portion of the material between the adjacent pipes, and air ducts extending from the chambers through the material between the pipes.

7. In a furnace, the combination with a heat absorbing element, a fire box combustion chamber, and a double water-jacketed air flue forming a back for the fire box, of a series of water-jacketed air chambers located between said element and said back so as to leave a combustion chamber between the back and the air chambers and between the latter and the said element, auxiliary combustion chambers alternating with the air chambers and connecting the other combustion chambers, and air ducts connecting the air chambers with all of said combustion chambers.

8. In a furnace, the combination with a heat absorbing element, a fire box combustion chamber, and water-circulating grate bars, of water plates having an air induction flue therebetween and extending from the floor of the furnace upwardly and forwardly into said chamber and terminating above the grate bars so as to form a contracted flue in said chamber, and induction and eduction water pipes to which the plates and the grate bars are connected.

9. In a furnace appliance, a plurality of U-shaped water pipes arranged in parallel rows, a non-heat conducting lining upon the opposite faces of the pipes of each row, said lining extending laterally between the pipes of each row and having apertures therein, and an air chamber formed in the lining.

In witness whereof I hereunto set my hand in the presence of two witnesses.

DANIEL B. DEVORE.

Witnesses:
 HERBERT TURNER,
 ETHELBERT V. BURRELL.

Copies of this patent may be obtained for five cents each, by addressing the "Commissioner of Patents, Washington, D. C."